March 13, 1934. W. A. D. EVANS 1,951,136
ELECTRIC LAMP DEVICE
Filed Feb. 8, 1930 3 Sheets-Sheet 1

INVENTOR
William A. D. Evans
HIS ATTORNEY

March 13, 1934.  W. A. D. EVANS  1,951,136
ELECTRIC LAMP DEVICE
Filed Feb. 8, 1930  3 Sheets-Sheet 2

INVENTOR
William A. D. Evans
BY Thos H. Brown
HIS ATTORNEY

March 13, 1934. W. A. D. EVANS 1,951,136
ELECTRIC LAMP DEVICE
Filed Feb. 8, 1930 3 Sheets-Sheet 3

INVENTOR
William A. D. Evans
BY
Thos. H. Brown
ATTORNEY

Patented Mar. 13, 1934

1,951,136

UNITED STATES PATENT OFFICE 1,951,136

ELECTRIC LAMP DEVICE

William A. D. Evans, Summit, N. J., assignor to General Electric Vapor Lamp Company, Hoboken, N. J., a corporation of New Jersey Application February 8, 1930, Serial No. 426,832

2 Claims. (Cl. 240—1)

The present invention relates to electric discharge devices generally and more particularly the invention relates to housings for such devices.

The object of the invention is to provide a housing for an electric discharge device, said housing having adjustable means to adapt the light emitted by such devices for various purposes. A more particular object of the invention is to provide a housing for an electric discharge device, being an ultra violet generator, whereby the light emitted by such device is adapted for particular purposes, as for example a reading light. Further objects and advantages attaching to said housing will be apparent from the following particular description and from the claims.

In accordance with these objects the invention comprises a housing having side walls made of glass, said glass walls having a definite light transmission characteristic, and a movable glass filter having a different light transmission characteristic than that of the glass walls, or of that of the glass container of the discharge device.

Figure 1:
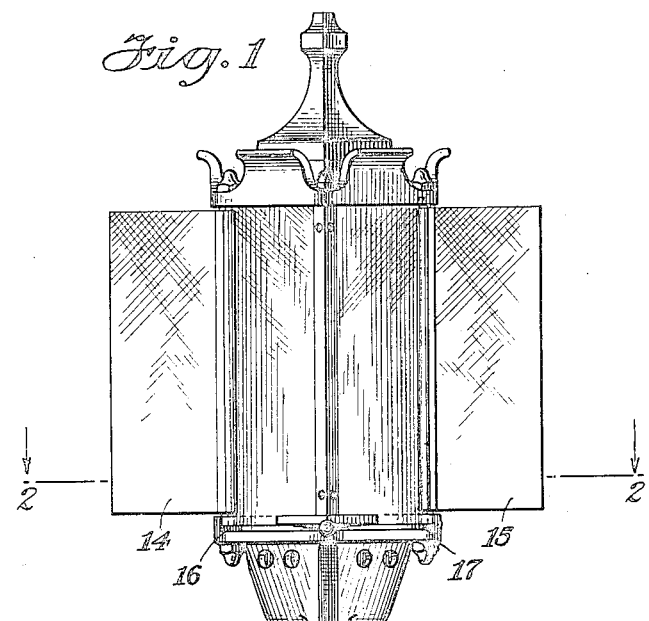
Figure 2:
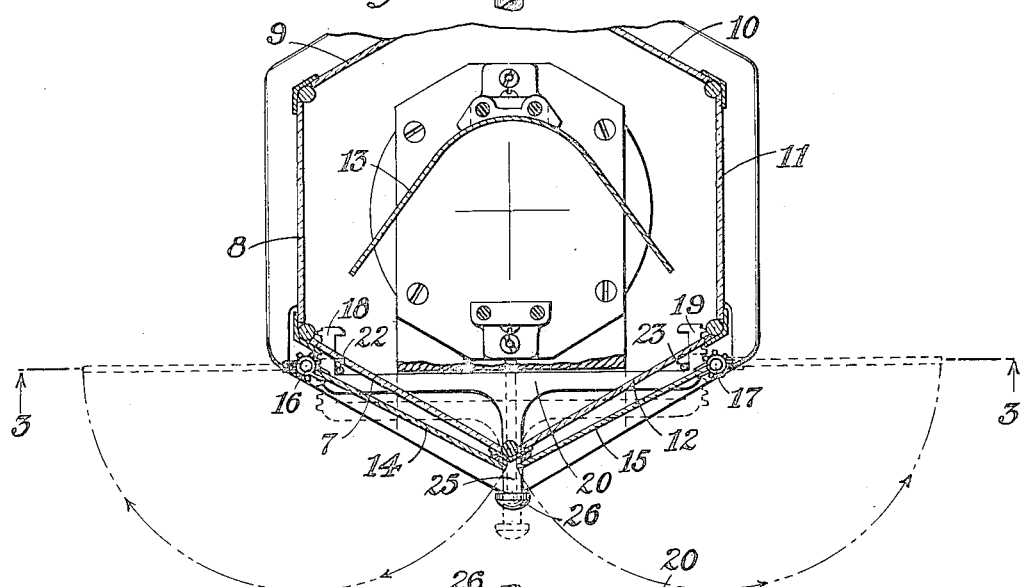
Figure 3:
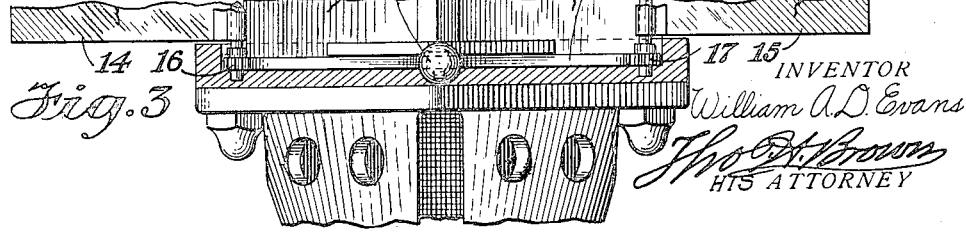
Figure 4:
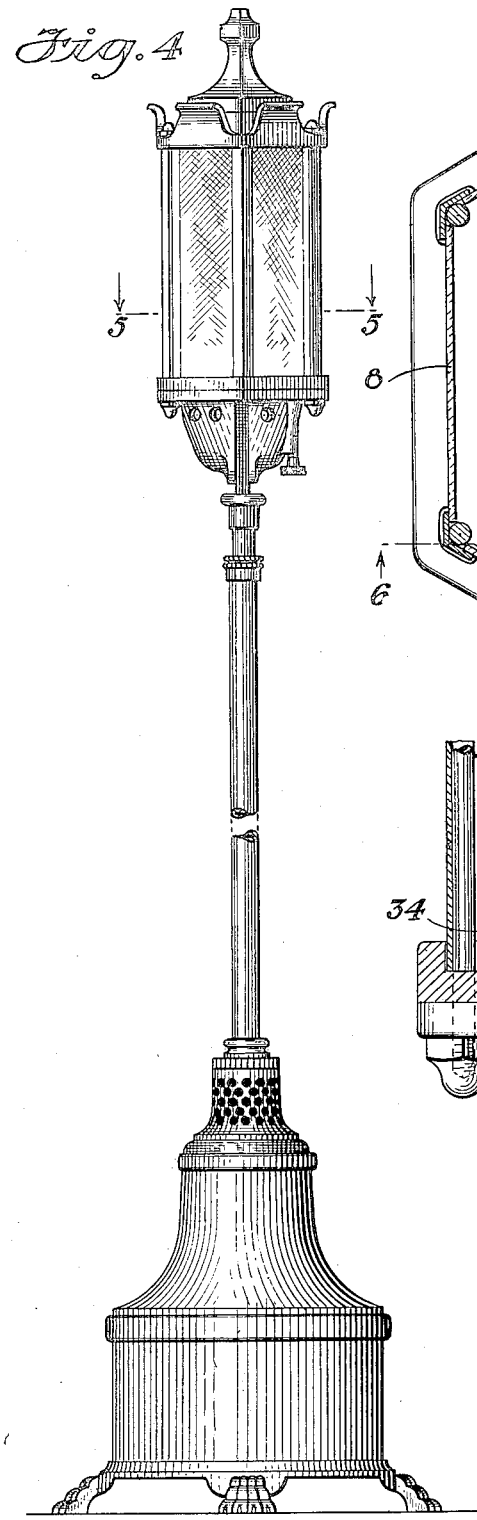
Figure 5:
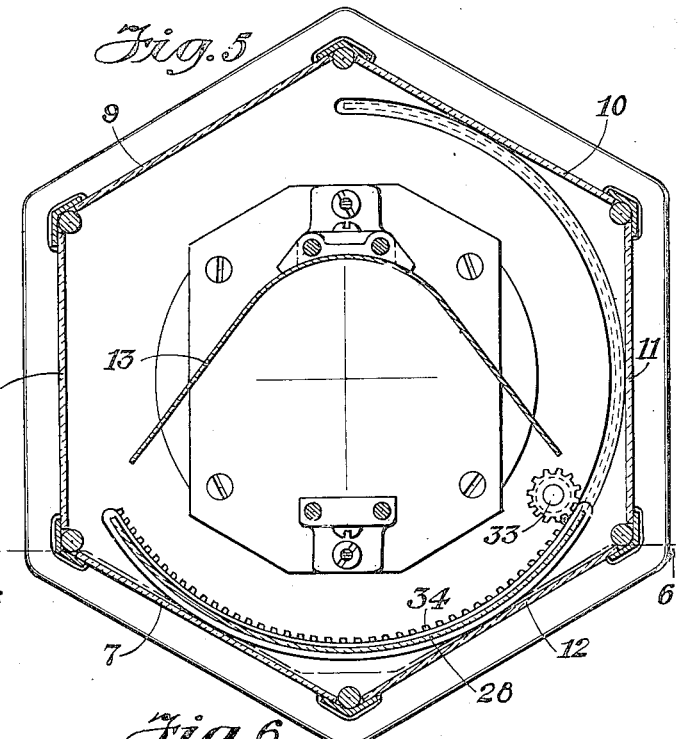
Figure 6:
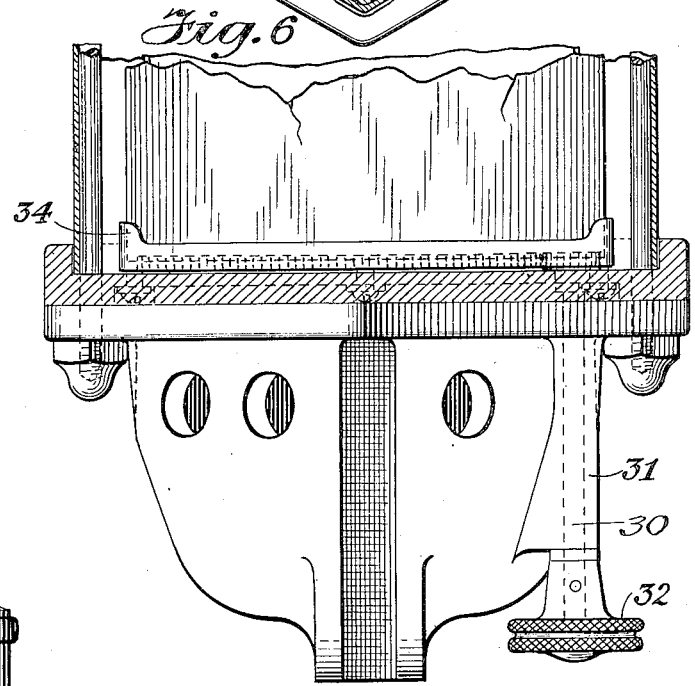
Figure 7:
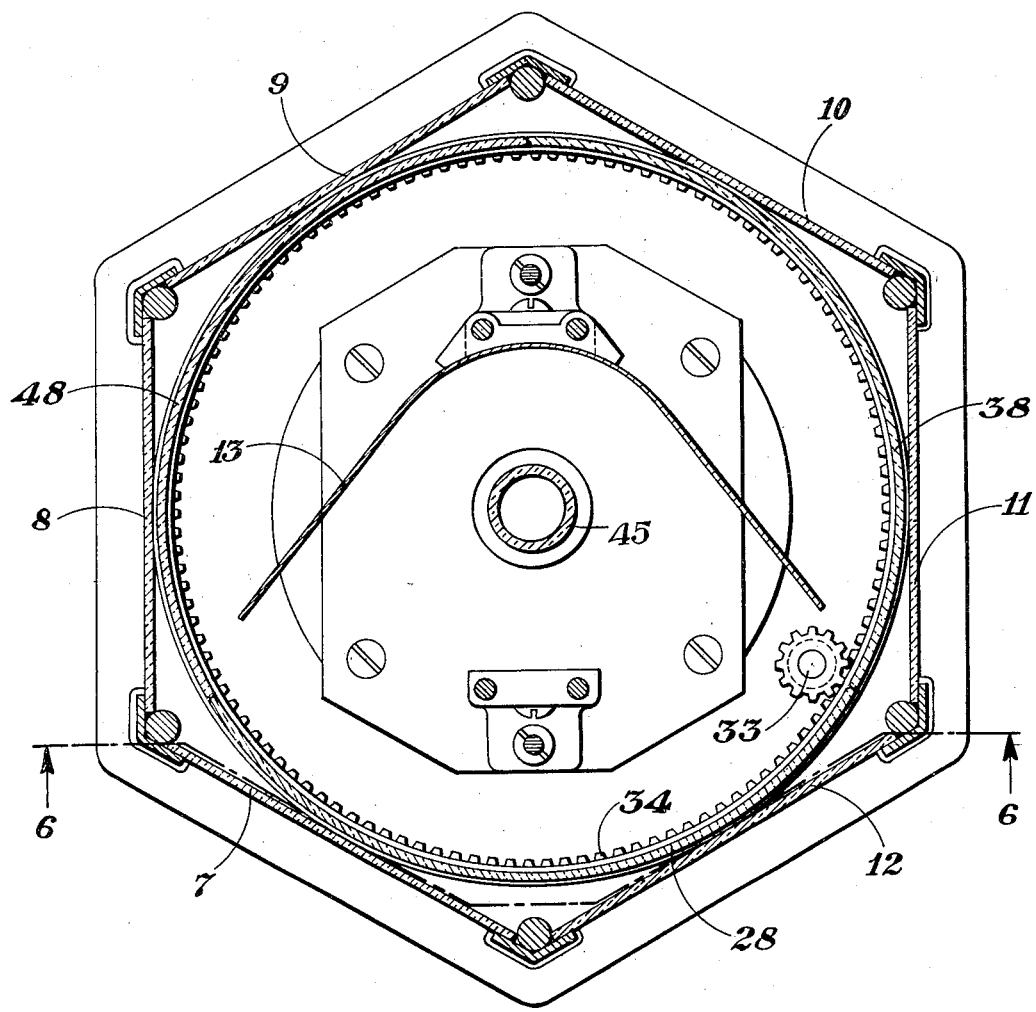

In the drawings accompanying and forming part of this specification two embodiments of the housing are shown in which, Fig. 1 is a front elevational view of one embodiment of the invention having glass wings, which are shown in an open position, Fig. 2 is a plan view of the same embodiment of the invention taken along the line 2—2 of Fig. 1. In this view the glass wings and the actuating means thereof are shown in a closed position with their open position indicated by dotted lines, Fig. 3 is a front view along the line 3—3 of Fig. 2 to show the actuating means of the same embodiment of the invention, the housing being partly broken away, Fig. 4 is an elevational view of a suitable support and a housing of an alternative embodiment of the invention. The housing shown in Fig. 1 may also be mounted on said support, Fig. 5 is a plan view of the alternative embodiment of the invention taken along the line 5—5 of Fig. 4. The glass filter being shown in its functioning position and its non-functioning position being indicated by dotted lines, Fig. 6 is an elevational view of part of the housing, the position of the actuating mechanism therein being indicated by dotted lines, Fig. 7 is similar to Fig. 5 except that the glass filter is shown as a full cylinder having three parts.

Like members denote like parts in all views of the device.

Referring to Figs. 1, 2 and 3 the housing has glass walls 7, 8, 9, 10, 11, 12 as shown in Fig. 2. Reflector 13, shown in Fig. 2, directs the light through the glass walls 7, 12 which have a light transmission characteristic different from that of the other glass walls 8, 9, 10, 11. For example, if an ultra violet generator is used as a light source in the housing, glass walls 7, 12 transmit such ultra violet rays while glass walls 8, 9, 10, 11 do not. As illustrated in these three figures the housing is equipped with glass wings 14, 15 movable directly by hand, or indirectly by actuating mechanisms, as hereinafter pointed out and which have desired different light transmission characteristics than that of the two windows 7, 12. In the foregoing example they do not transmit ultra violet radiations. Thus when said glass wings 14, 15 are in a closed position, as shown in Fig. 2, all ultra violet radiations are cut off and the lamp may be used for many purposes where only illumination is desired, as for reading. The means for moving said glass wings 14, 15 comprises arm 20 having two geared end members 18, 19 at right angles thereto adapted to engage with two gears 16, 17 attached to movable glass wings 14, 15 as shown in Figs. 2, 3. Attached to the mid-point of arm 20 is a rod 25 extending to the outside of the housing and having an enlargement 26 at the end thereof as shown in Fig. 2. A slight push or pull in said enlargement 26 is sufficient to close or open said glass wings 14, 15. Stops 22, 23 are provided to limit the movement of said wings 14, 15 as shown in Fig. 2.

Having this structure the housing is useful for a great variety of purposes as it provides a means whereby the light emitted by a standard light source, such as an electric discharge device of the mercury vapor type which may be an ultra violet generator, can be easily and quickly changed in color, radiation characteristics and in quality. As has already been pointed out, if the glass walls 7, 12 transmit ultra violet radiations the glass wing 14, 15 can be of such glass as does not transmit such radiations, thus the outfit becomes useful for many purposes where ultra violet radiation is not desirable, but where the characteristic yellow-green light of the mercury vapor lamp is desirable. As the outfit is designed primarily for home use such purposes might be reading, sewing, photography, or general illumination. Further the housing may be equipped with walls and wings of a great variety of the well known color filters to change the color of the emitted light as desired. By the use of filters which transmit only the ultra violet radiations, but none of the visible radiations fluorescent lighting effects may be had.

Referring to Figs. 4, 5, 6 in which an alternative embodiment of the invention is illustrated. In this embodiment the glass walls 7, 8, 9, 10, 11 and 12 of the housing have the same light transmission characteristics as those in the embodiment disclosed in Figs. 1, 2, 3. In place of the glass wings 14, 15 a cylindrically shaped glass 28 is used. Said glass 28 has the same light transmission characteristics as the glass wings 14, 15. The actuating means comprises rod 30 shown by dotted lines in Fig. 6, through an offset 31 of the housing. Said rod 30 has a handscrew 32 attached to the exterior end thereof and a gear 33 attached to the interior end thereof adapted to engage the toothed metal setting 34 of glass 28. When the handscrew 32 is turned glass 28 is thereby moved to its functioning or non-functioning position in the housing, the non-functioning position being shown by dotted lines in Fig. 5. Glass 28 instead of being a third of a cylinder as illustrated in Fig. 5 is shown as a full cylinder in Fig. 7 and one having three parts 28, 38, 48, each part having a different light transmission characteristic from that of the other parts, and from that of the glass walls of the housing, or the container 45 of the discharge device. Thus it is possible to affect three changes in the emitted light simply by turning handscrew 32.

It is to be understood that the glass walls 7 and 12 can be of quartz or of glass which has an ultra-violet cut off in the near, or far, or extreme regions of the ultra violet spectrum, as desired, and that the wings 14, 15 and the sheet 28 can be of glass which does not transmit any ultra violet radiation or of a glass having an ultra violet cut off intermediate that of the plates 7 and 12 and sheet 28 thus combining in a unitary and simple structure a very flexible light source in which the transmission of desired light can be secured from visible radiations down through the near, far and extreme ultra violet spectrum emissions of the quartz lamp in the housing and accompanied by the visible radiations of the lamp, or not, as desired.

While I have shown, described and have pointed out in the annexed claims certain new and novel features of the invention it will be understood that various omissions, substitutions and changes in the form and details of the device and in its use and operation may be made by those skilled in the art without departing from the broad spirit and scope of the invention.

I claim:—

1. In combination an electric discharge lamp device of the mercury vapor type being an ultra violet generator having a container possessing definite ultra violet light transmitting characteristics, a housing for said device comprising glass walls having definite ultra violet light transmitting characteristics, a reflector in said housing adapted to direct the radiations from said generator in a desired direction, a movable glass filter mounted inside said housing, said filter being a cylinder and comprising a plurality of glass panels having definite and different light transmitting characteristics from each other, said filter having a toothed part, an actuating means for said filter in said housing comprising a rod through said housing having a turning means on its exterior end and a gear on its interior end adapted to engage the toothed part of said filter member to move the panels of said filter across the path of the directed radiations, said container walls, said housing walls and said filter panels having different light transmitting characteristics.

2. In combination an electric discharge lamp device having a container possessing definite light transmitting characteristics, a housing for said device comprising glass walls having definite light transmitting characteristics, a reflector in said housing adapted to direct the radiations from said device in a desired direction, a movable glass filter mounted inside said housing, said filter being a cylinder and comprising a plurality of glass panels having definite and different light transmitting characteristics from each other, said filter having a toothed part, an actuating means for said filter in said housing comprising a rod through said housing having a turning means on its exterior end and a gear on its interior end adapted to engage the toothed part of said filter member to move the panels of said filter across the path of the directed radiations, said container walls, said housing walls and said filter panels having different light transmitting characteristics.

WILLIAM A. D. EVANS.